Figure 1:
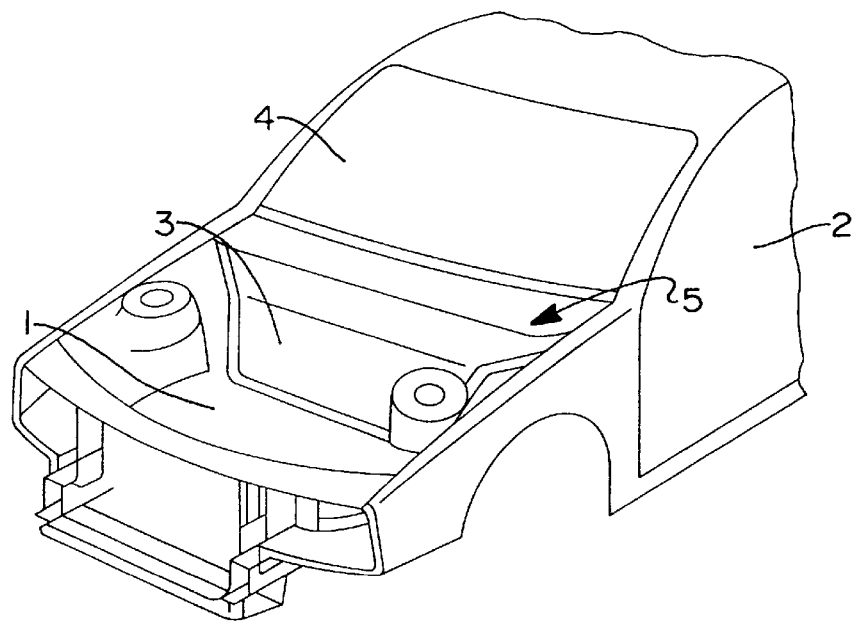

United States Patent [19]

Egner-Walter et al.

[11] Patent Number: 5,946,763
[45] Date of Patent: Sep. 7, 1999

[54] MODULE FOR A MOTOR VEHICLE

[75] Inventors: Bruno Egner-Walter, Heilbronn; Eckhardt Schmid, Brackenheim, both of Germany

[73] Assignee: ITT Manufacturing Enterprises Inc., Wilmington, Del.

[21] Appl. No.: 08/875,027

[22] PCT Filed: Jan. 10, 1996

[86] PCT No.: PCT/EP96/00076

§ 371 Date: Sep. 23, 1997

§ 102(e) Date: Sep. 23, 1997

[87] PCT Pub. No.: WO96/22203

PCT Pub. Date: Jul. 25, 1996

[30] Foreign Application Priority Data

Jan. 17, 1995 [DE] Germany ............................ 19501210

[51] Int. Cl.$^6$ .................................................. A47L 1/00
[52] U.S. Cl. ........................................................ 15/250.02
[58] Field of Search ............................. 15/250.3, 250.01, 15/250.02, 250.31, 250.29, 250.04; 239/284.1, 589.1, 303, 304, 355; 296/192, 208, 96.15, 96.17

[56] References Cited

U.S. PATENT DOCUMENTS

| | | | |
|---|---|---|---|
| 4,935,983 | 6/1990 | Yamamoto | 15/250.16 |
| 4,945,601 | 8/1990 | Bilodeau | 15/250.24 |
| 5,005,248 | 4/1991 | Bonar | 15/250.04 |
| 5,230,547 | 7/1993 | Koukal et al. | 296/192 |
| 5,261,254 | 11/1993 | Cattane . | |
| 5,327,613 | 7/1994 | Ohtsu | 15/250.02 |
| 5,561,882 | 10/1996 | Eustache et al. | 15/250.001 |
| 5,669,986 | 9/1997 | Buchanan, Jr. et al. | 134/42 |
| 5,797,159 | 8/1998 | Berge et al. | 15/250.31 |

FOREIGN PATENT DOCUMENTS

| | | | |
|---|---|---|---|
| 148716 A2 | 7/1985 | European Pat. Off. | 15/250.01 |
| 413308 | 2/1991 | European Pat. Off. . | |
| 1217228 | 5/1966 | Germany | 15/250.01 |
| 3342384 A1 | 6/1984 | Germany | 15/250.01 |
| 4107475 A1 | 9/1992 | Germany | 15/250.04 |
| 61-191454 | 8/1986 | Japan | 15/250.01 |
| 5-262206 | 10/1993 | Japan | 239/284.1 |
| 6-24296 | 2/1994 | Japan | 15/250.04 |

OTHER PUBLICATIONS

English translation of the International Preliminary Examination Report of Application No. PCT/EP96/00076 filed Jan. 10, 1996.

*Primary Examiner*—Robert Warden
*Assistant Examiner*—Andrew Aldag
*Attorney, Agent, or Firm*—J. Gordon Lewis

[57] ABSTRACT

The invention pertains to a module for a motor vehicle which comprises a windshield wiper system (7) and a windshield washer system, wherein a receptacle (6) that is predominantly realized in the form of a fluid container is shaped such that it surrounds the windshield wiper system (7) at least approximately complimentarily and simultaneously serves as a cover for the so-called radiator tank of the motor vehicle body, and wherein said receptacle is provided with an air passage (17) that leads to the passenger compartment. The invention also aims to develop a module of this type in such a way that it fulfills additional functions and can be delivered to the motor vehicle manufacturer in the form of a complete module. According to the invention, a windshield wiper system (7) that is mounted on a carrier and the receptacle (6) can be connected into a module, wherein the receptacle (6) comprises several independent tanks (8,9,10) for different fluids which are respectively assigned with a controllable pump (14,15). In addition, the receptacle (6) comprises a rainwater inlet (16) for automatically filling the tank (8) for the washing fluid as well as an exchangeable fresh air filter (61).

16 Claims, 7 Drawing Sheets

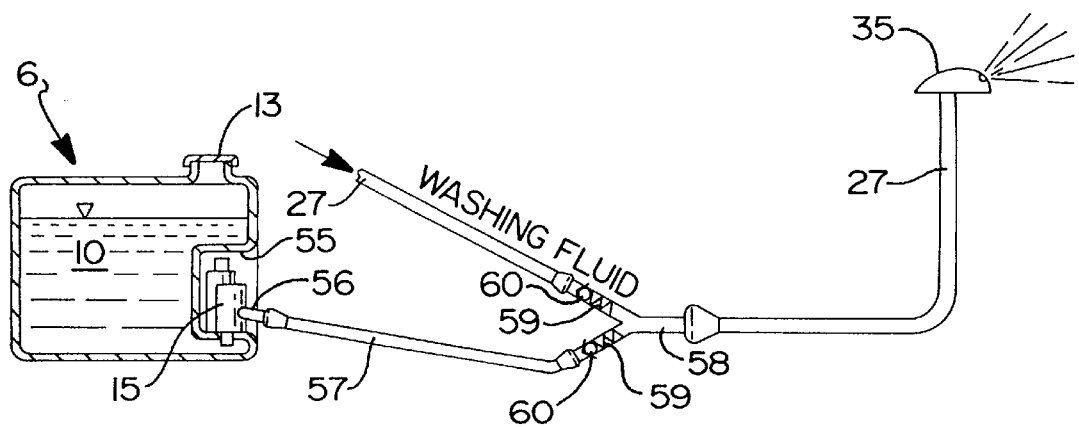

FIG 7
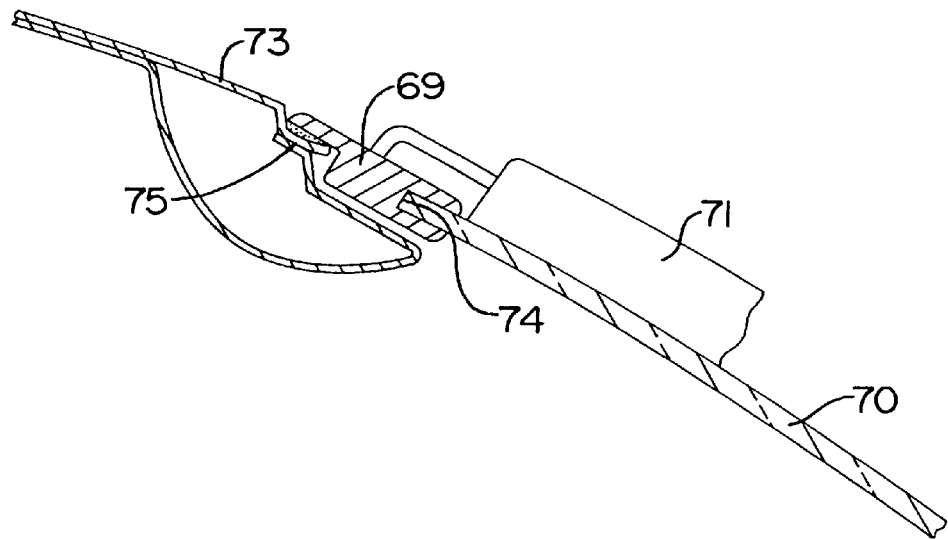
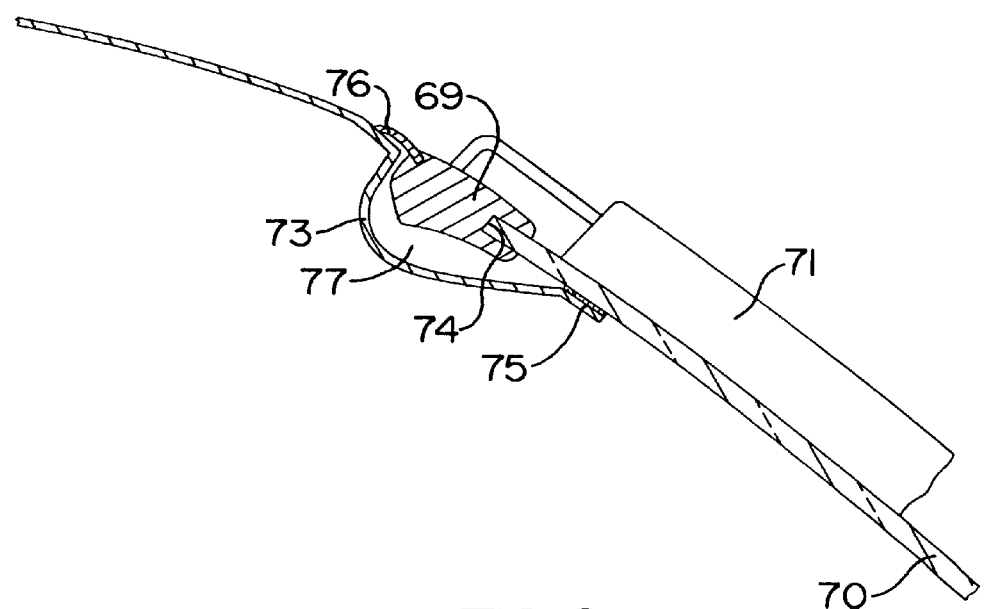
FIG 8

FIG 9
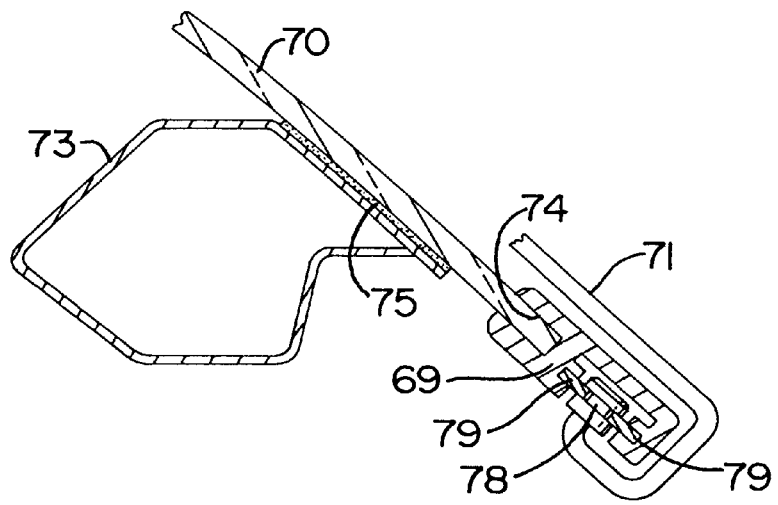
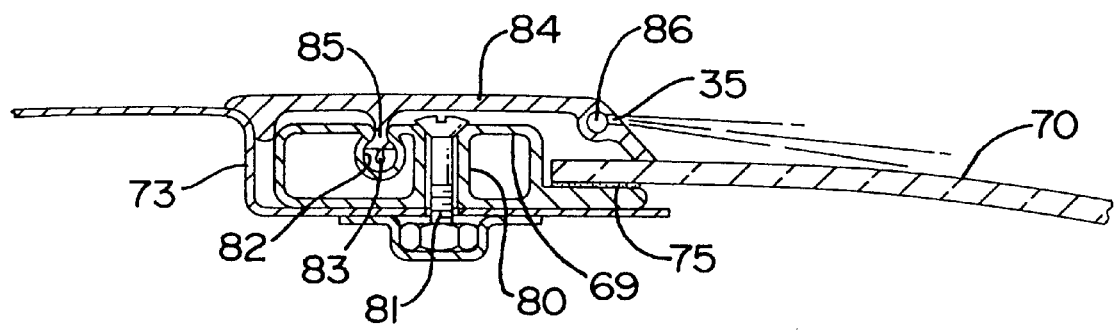
FIG 10

MODULE FOR A MOTOR VEHICLE

The invention pertains to a module for a motor vehicle which comprises a windshield wiper system and a windshield washer system, wherein a receptacle that is essentially realized in the form of a fluid container is shaped so that it surrounds the windshield wiper system at least approximately complimentarily and is adapted to the shape of the motor vehicle body within the region of the so-called radiator tank. The receptacle simultaneously serves for covering the radiator tank or at least a portion of it. The term radiator tank refers to the region of the motor vehicle body which is located in the engine compartment directly in front of the fire wall and beneath the windshield. This receptacle is also realized in such a way that it includes an air passage into the passenger compartment.

EP 0,588,708 A1 discloses a windshield wiper system with these characteristics. Although this system has a compact design and completely fills the space within the region of the radiator tank, it merely fulfills the generally known functions of a windshield wiper/washer system.

The invention is based on the objective of additionally developing a windshield wiper/washer system of this type in such a way that it fulfills additional functions and can be delivered to the vehicle manufacturer in the form of a module.

This objective is attained with a module for a motor vehicle which is realized in accordance with the disclosed invention. The described combination of characteristics results in a compact module that can be installed in the motor vehicle body by the vehicle manufacturer with low mounting expenditures and provides the vehicle operator with a variety of functions.

Due to the arrangement of several sufficiently large tanks for different fluids, the vehicle operator is, depending on the respective variation of the module, able manually to select the functions of the different pumps assigned to the tanks with respect to the composition or the function of the washing fluids contained in the respective takes or the washing fluid to be applied onto the windshield to be cleaned or select an automatic control of these functions. If the windshield is normally dirty, normal washing fluid, i.e., washing water and, if so required, a detergent additive is sprayed onto the windshield; if the windshield is more heavily soiled, a strong cleaning agent is admixed into the washing fluid from a separate container in metered fashion. In this case, it is advantageous if the strong cleaning agent is not added to the entire supply of washing fluid in the tank. The strong cleaning agent is only added to the quantity of washing fluid required for the respective cleaning process. This can be easily attained with the disclosed module. In this case, the conveyed flow of the strong cleaning agent is coupled to the washing fluid line that leads to the spraying nozzle, namely via a coupling piece that has the shape of a T or Y.

During colder seasons, in which the washing fluid may freeze, antifreeze is pumped into the washing fluid tank from a separate tank. This process can either be manually controlled by the driver or, according to one additional refinement of the invention disclosed, by an electronic control element that is connected to the pump assigned to the antifreeze tank. This electronic control element is advantageously accommodated in a separate chamber or a corresponding bay of the receptacle and designed in such a way that it determines the proper quantity of the antifreeze based on values acquired by different sensors. The acquired values of the density and the temperature of the washing fluid represent the actual degree of protection against freezing of the washing fluid which is compared to the required degree of protection against freezing derived from the actual ambient temperature. The electronic control element correspondingly activates the pump for the antifreeze until the actual degree of protection against freezing of the washing fluid corresponds to the required degree of protection against freezing of the washing fluid.

Since the density of antifreezes for windshield washer systems is usually lower than water, one embodiment of the module which is disclosed is advantageous with respect to a superior mixing of the washing fluid and the antifreeze, particularly while the vehicle is at a standstill. According to this embodiment, the antifreeze is pumped into the washing fluid tank either through the bottom of the tank or through a side wall in the vicinity of the tank bottom.

An additional improvement with respect to the maintenance of the wiper/washer system is attained. The washing fluid tank is automatically filled with rainwater. In this case, a particularly simple construction of the rainwater inlet is attained due to the fact that the rainwater inlet is directly connected to the filler neck of the washing fluid tank. The filling level limiter situated in the filler neck also fulfills the function of limiting the rainwater intake, i.e., an additional filling level limiter for the rainwater inlet is not required. However, it is possible that very dirty water or water containing undesirable additives is introduced into the washing fluid tank via the rainwater collecting device, in particular, when driving the vehicle during the winter months or when washing the vehicle in a car wash. In such instances, the rainwater collecting device must be sealed relative to the surroundings of the vehicle by means of a suitable closure.

The utilization of rain sensors or moisture sensors is already known for realizing an automatic control of the windshield wiper movement. However, the installation of such sensors at the vehicle manufacturer can be significantly simplified if the module is already equipped with them. This sensor is arranged in a section of the receptacle that points toward the windshield and is not covered by the hood of the vehicle.

When manufacturing modules with different types of windshield wiper systems, it is particularly cost-efficient if the respective type of windshield wiper system can be combined with the same receptacle. In this respect, the invention proposes another embodiment. In this case, the different types of windshield wiper systems comprise identically designed or shaped sections and identical fastening sections at the key points in question. Consequently, only one type of receptacle is required, i.e., the storage and disposition of the module components is simplified.

If a motor vehicle must be equipped with a so-called linear wiper system, the invention proposes the use of another module. In order to attain a more favorable transport, in particular, with respect to the utilization of the transport space, it may be advantageous to transport the windshield wiper system and the completely equipped receptacle separately to the vehicle manufacturer and connect said components into a module at the vehicle manufacturer during the assembly of the vehicle.

Additional advantageous embodiments of a module with a linear wiper system are described in detail in the following embodiments.

If the fresh air filter needs to fulfill strict requirements, it is proposed to realize the fresh air filter in accordance with an exchangeable filter system consisting of a fine filter and a subsequently arranged activated carbon filter is arranged in a corresponding recess of the receptacle. This filter system retains dust, soot, pollen as well as exhaust gases of motor vehicles.

Since such a fresh air filter must be exchanged within certain intervals, it is arranged in the respective recess of the receptacle such that it can be easily exchanged.

In addition, it may be advantageous to integrate an engine compartment light and a corresponding switch that is activated by opening or closing the hood into the cover of the module.

Figure 3:
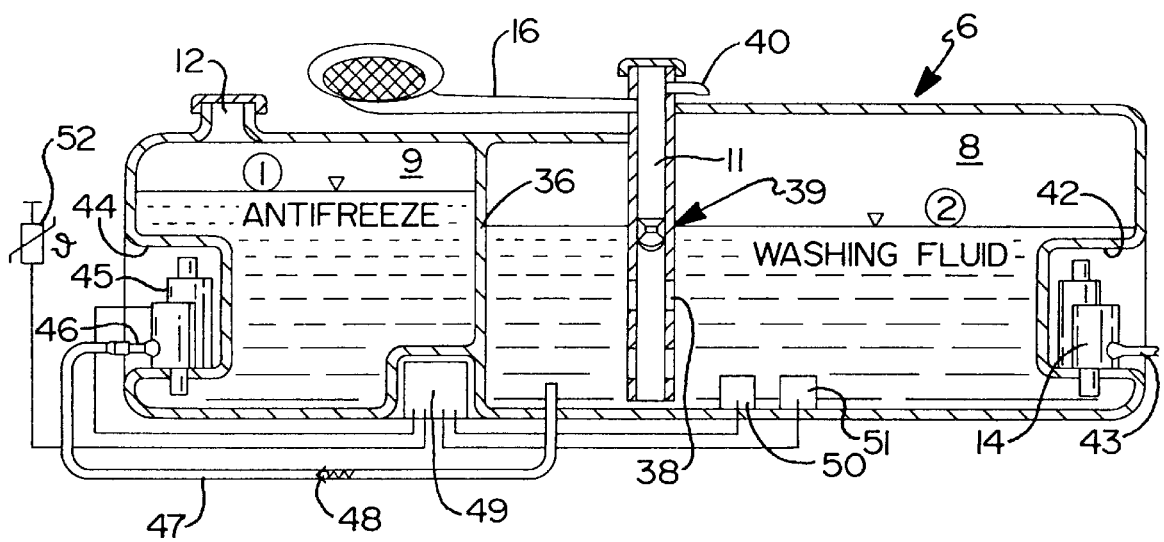
Figure 2:
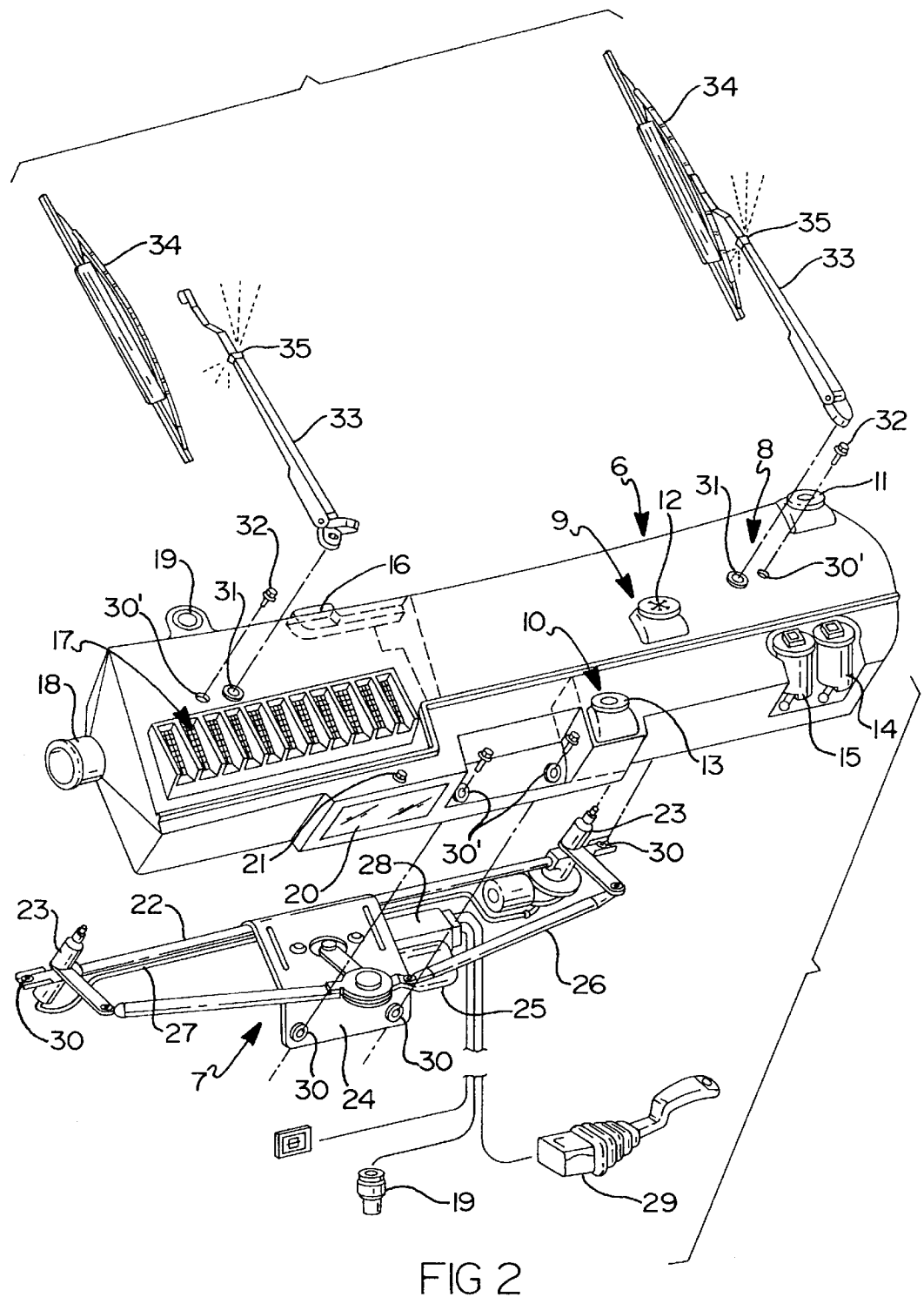
Figure 6:
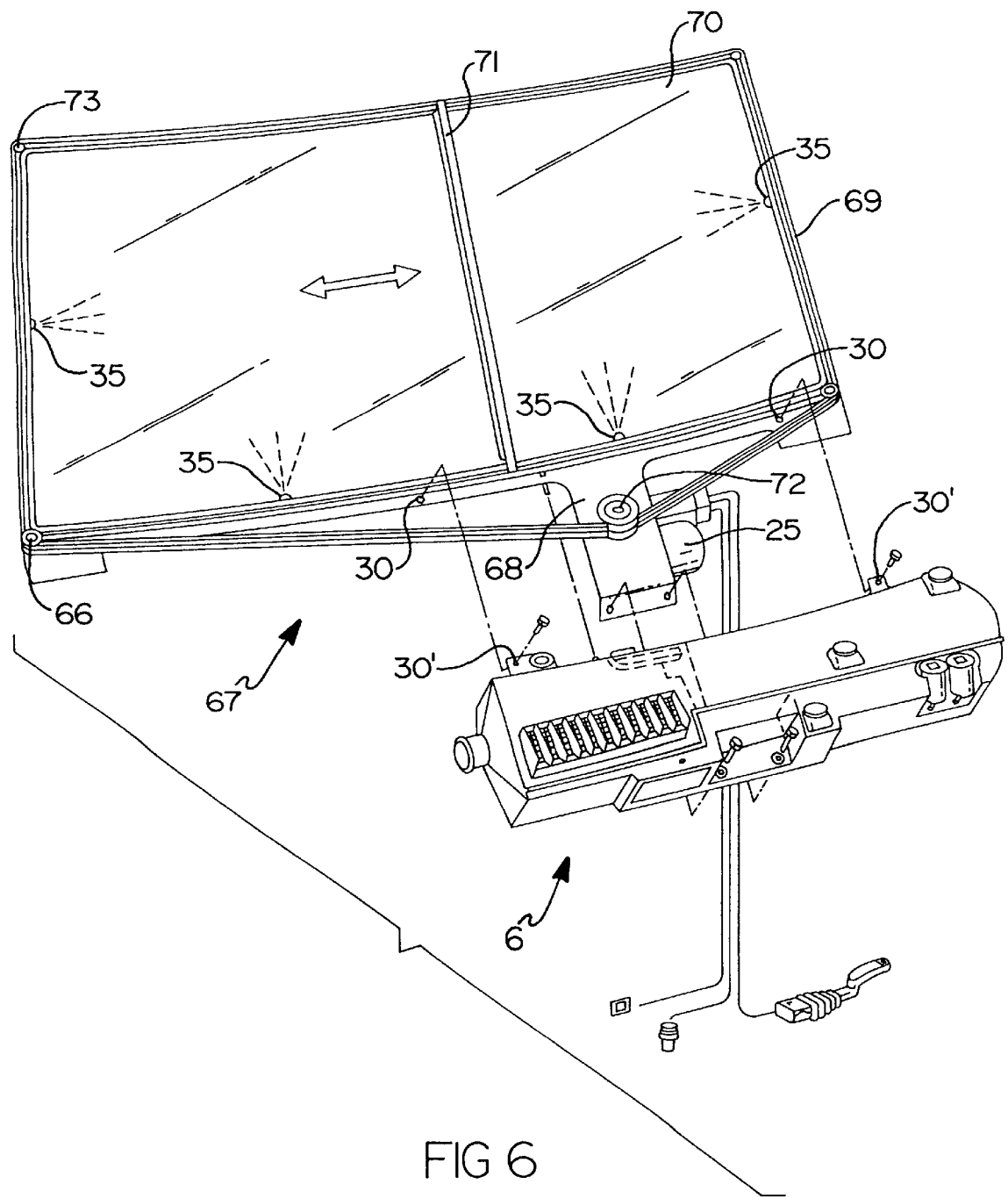
Figure 11:
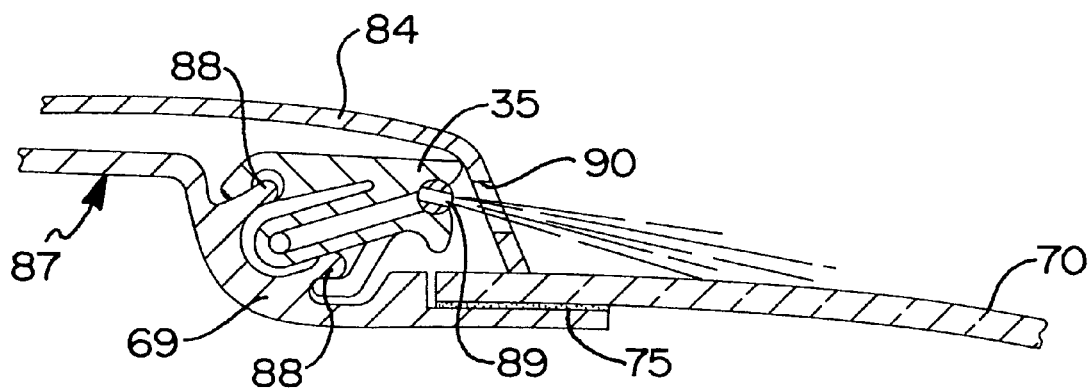
Figure 12:
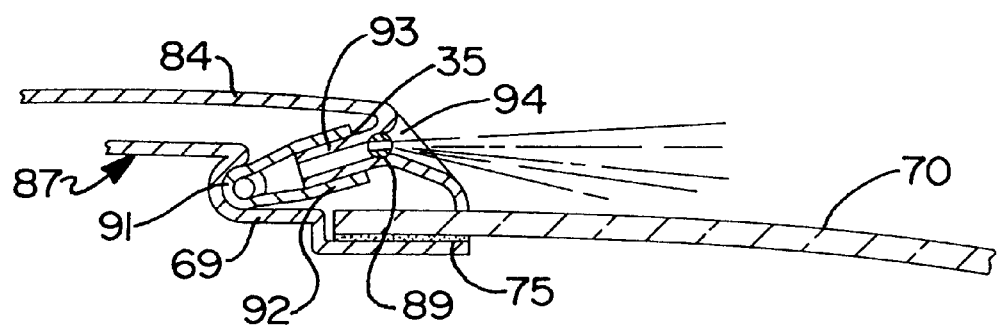

A few embodiments of the invention are described below with reference to the figures. The figures show:

FIG. 1, a schematic overview of the front portion of a passenger car body shell;

FIG. 2, a module with a tubular frame system in the form of a partially exploded view;

FIG. 3, a schematic overview of part of a module receptacle in the form of a sectional representation;

FIG. 4, a schematic representation of an intense washing/cleaning process;

FIG. 5, a fresh air filter system;

FIG. 6, a module with a linear wiper system in the form of a partially exploded view;

FIG. 7, the upper connection of a module with a linear water system to the motor vehicle body in the form of a schematic sectional representation;

FIG. 8, another example of the upper connection of a module with a linear wiper system to the motor vehicle body in the form of a schematic sectional representation;

FIG. 9, the lower connection of a module with a linear wiper system to the motor vehicle body in the form of a schematic sectional representation;

FIG. 10, the lateral connection of a module with a linear wiper system to a motor vehicle body in the form of a sectional representation;

FIG. 11, another example of the lateral edge of a module with a linear wiper system in the form of a sectional representation, and FIG. 12, another example of the lateral edge of a module with a linear wiper system in the form of a sectional representation.

FIG. 1 mainly provides an overview of the space conditions of passenger car body shell. A conventional fire wall 3 serves for separating the engine compartment 1 from the passenger compartment 2. The region that is located directly in front of the fire wall 3 and underneath the opening 4 for the windshield and transversely extends over the entire width of the engine compartment 1 is usually referred to as the radiator tank 5. The module according to the invention is installed within the region of this radiator tank 5.

One example of such a module is shown in FIG. 2 in the form of an exploded view. The largest component of this module is the receptacle 6 that is illustrated approximately in the center of FIG. 2. The outer contour of this receptacle is adapted to the shape of the motor vehicle body within the region of the radiator tank 5 and simultaneously serves as a cover for the radiator tank 5 within this region. Within its lower region that is covered in FIG. 2, the receptacle 6 is shaped in such a way that it surrounds the windshield wiper system 7 drawn underneath the receptacle 6 at least approximately complimentarily. This means that corresponding recesses or bays are provided on the underside of the receptacle 6, i.e., the windshield wiper system 7 that is realized in the form of a generally known tubular frame system can be accommodated in these recesses or bays.

The larger portion of the receptacle 6 which is situated on the right side in FIG. 2 is essentially realized in the form of a fluid container that is divided into a tank 8 for washing fluid, a tank 9 for antifreeze and a tank 10 for a strong cleaning agent by means of corresponding partition walls. These tanks 8, 9, 10 are separated and consequently must be filled separately. A filler neck 11 for the washing fluid, a filler neck 12 for the antifreeze and a filler neck 13 for the strong cleaning agent are shown on the upper side of the receptacle. Pumps 14, 15 that are arranged in corresponding bays of the receptacle 6 are shown on the right front side of the receptacle. The intake of right pump 14 protrudes into the tank 8 for the washing fluid, i.e., this pump is intended for conveying the washing fluid. The intake of the left pump 15 is connected to the tank 13 for the strong cleaning agent. The pump 14 for the washing fluid is conventionally equipped with a filling level indicator that informs the driver of the necessity to add washing fluid to the tank 8. A pump for conveying the antifreeze is not shown in FIG. 2. This pump is arranged in a covered bay of the receptacle 6. The rainwater inlet 16 that directly runs into the filler neck 11 for the washing fluid (not shown) is situated at the upper edge of the receptacle 6. The other end of the rainwater inlet 16 is connected to a rainwater collecting device (not shown).

The smaller left portion of the receptacle 6 is essentially intended for accommodating an easily exchangeable fresh air filter within the region of an air passage 17. The air outlet connection 18 is shown on the left side of the receptacle 6. Cleaned fresh air emerges from this air outlet and is conveyed into the passenger compartment 2 (FIG. 1) via an air channel that is connected to this air outlet 18. A rain sensor 19, the sensitive upper side of which cannot be covered by the hood of the vehicle, is arranged on the rear edge of the receptacle 6 above the air passage 17. Since the air passage 17 is covered by the hood, corresponding air passage openings must be provided in the hood at this location.

An engine compartment light 20 that is triggered by a switch 21 that is activated by the hood is installed in the front wall of the receptacle 6 which points toward the engine compartment 1, within the region of the air passage opening.

The windshield wiper system 7 conventionally comprises a so-called tubular frame 22 that carries the two wiper bearings 23 and a motor carrying plate 24, on which the wiper motor 25 is fastened. The bearing shafts of the wiper bearings 23 are able to carry out a rotational pendulum motion via a linkage 26 that is driven by the motor. The bearing shafts of both wiper bearings 23 are realized in hollow fashion, i.e., the washing fluid conveyed through the washing fluid line 27 is able to pass through these hollow bearing shafts. The process of pumping the washing fluid into the washing fluid line 27 is described below. An electric plug connection 28 that serves for triggering the wiper motor 25 via corresponding control elements, e.g., a steering column switch 29, a rain sensor 19, or the like, is shown directly adjacent to the wiper motor 25. However, the control elements shown in this figure are arranged at different locations of the motor vehicle.

The windshield wiper system 7 that is realized in the form of a tubular frame system has 4 fastening points 30, at which the windshield wiper system is fastened to the motor vehicle body by means of screws. These fastening points 30 are simultaneously used for connecting the windshield wiper system 7 and the receptacle 6 into a module. Consequently, the receptacle 6 is provided with through-openings of corresponding shape at the locations of the fastening points 30'. In addition, it is necessary for the bearing shafts of the wiper bearings 23 to extend through the receptacle 6 with their free end. The receptacle 6 is provided with two additional through-openings 31 in order to insert the bearing shafts of the wiper bearings 23 from the bottom. The windshield wiper system 7 and the receptacle 6 are connected into a module at the aforementioned fastening points 30, 30' by means of corresponding screws 32.

FIG. 2 also shows the two wiper arms 33 that respectively carry one wiper blade 34. One respective spraying nozzle 35 for spring washing fluid onto the windshield to be cleaned is arranged on each wiper arm 33. The spraying nozzle 35 is connected to the fluid channel in the bearing shaft of the wiper bearing 23 via a hose that extends along the wiper arm 33.

At the time of the delivery to the vehicle manufacturer, the wiper arms 33, 34 are usually not mounted to the windshield wiper system 7. These wiper arms are delivered separately and fastened to the ends of the bearing shafts of the wiper bearings 23 after the module is mounted to the vehicle. The fastening points 30, 30' also serve for fastening the module to the motor vehicle body.

FIG. 3 shows a schematic partial overview of the receptacle 6 of a module in the form of a sectional representation. The right portion of FIG. 3 shows the tank 8 for the washing fluid which is separated from the tank 9 for the antifreeze arranged on the left side in FIG. 3 by means of a partition wall 36. The tank 8 for the washing fluid can be filled via the filler neck 11. This filler neck is designed in accordance with the given requirements. It extends up to the vicinity of the bottom of the tank 8 in the form of a tube and comprises several lateral outlet openings 38 within the lower region. A float valve that acts as a filling level limiter 39 and maintains the tank volume located above the filling level limiter [39] free for adding a certain volume of the antifreeze is arranged inside of the tube of the filler neck 11 at a certain elevation. An overflow 40 that is arranged at the upper end of the filler neck 11 cooperates with the filling level limiter 39. Excess quantities of the washing fluid can be discharged via this overflow. This figure also shows that a rainwater inlet 16 runs into this filler neck 11 at the upper end of the filler neck 11. Consequently, the filling level limiter 39 and the overflow 40 are also functional if rainwater is introduced into the tank 8 via the rainwater inlet 16.

The pump 14 for conveying the washing fluid is arranged in a lateral bay 42 of the receptacle 6. The connection piece 43 of this pump on the outlet side can be connected to a washing fluid line 27, through which the washing fluid is transported to the spraying nozzles 35 on the wiper arms 33. A pump 45 for the antifreeze is arranged in another bay 44 of the receptacle 6. A fluid line 47 with a return valve 48 is inserted into the connection piece 46 of this pump on the outlet side. The fluid line 47 extends into the tank 8 for the washing fluid through the bottom. In order to control the pumping of the antifreeze into the tank for the washing fluid at dangerously low temperatures, the pump 45 is triggered by an electronic control element 49 that is also arranged in a bay of the receptacle 6. The electronic control element 49 receives a signal from a sensor 50 that serves for measuring the density of the washing fluid, from a sensor 51 for measuring the temperature of the washing fluid, and from a sensor 52 for measuring the outside temperature. The received signals serve for comparing the actual degree of protection against freezing of the washing fluid and the required degree of protection against freezing of the washing fluid which corresponds to the outside temperature in the electronic control element 49. If so required, the electronic control element activates the pump 45 in order to pump the antifreeze from the tank 9 into the tank 8 for the washing fluid. In this case, the pump 45 remains activated until the actual degree of protection against freezing corresponds to the required degree of protection against freezing of the washing fluid. In this context, it should also be mentioned that the tank 9 for the antifreeze can be separably filled via the filler neck 12.

The schematic representation according to FIG. 4 pertains to an embodiment in which a separate tank 10 for a strong cleaning agent is provided in addition to the tank 8 for the washing fluid and the tank 9 for the antifreeze. The strong cleaning agent may, if so required, be transported from the tank 8 to the flow of washing fluid conveyed to the spraying nozzles 35 via the washing fluid line 27 as a function of the degree of soiling of the windshield to be cleaned. For reasons of simplicity, only the tank 10 for the strong cleaning agent and the line system that serves for the fluid transport are schematically illustrated in FIG. 4. The tank 10 can be filled via a separate filler neck 13, with the pump 15 for the strong cleaning agent being arranged in a bay 55 of the receptacle 6. A hose section 57 that is coupled to the washing fluid line 27 via a Y-shaped coupling piece 58 is connected to the connection piece 56 of the pump 15 on the outlet side. The washing fluid line 27 and the hose section 57 are respectively connected to one inlet branch 59 of the coupling piece 58. A return valve 60 is arranged in each inlet branch 59. These return valves prevent the respective fluid from flowing back into the tank 8 for the washing fluid line 27 or the tank 10 for the strong cleaning agent from the section situated between the coupling piece and the spraying nozzle 35.

FIG. 5 shows a partially sectioned representation of the portion of the receptacle 6 in which a fresh air filter 61 is arranged. This fresh air filter 61 represents a filter system, in which a fine filter 62 and a subsequently arranged activated carbon filter 63 are combined into one unit. This fresh air filter 61 is designed similarly to a cassette and inserted into a box-shaped recess 64 of the receptacle 6 from the top. The fresh air filter is fixed in the recess by means of a few suitable fastening elements 65. In order to allow a simple exchange of the fresh air filter 61, these fastening elements 65 are realized in the form of snap connections that can be opened and closed without requiring additional tools. The open upper side of the fresh air filter 61 that is inserted into the recess 64 is intended as an air intake. The air cleaned by the fresh air filter 61 emerges from the receptacle 6 via the lateral connection piece 18. A line that conveys the cleaned air to the passenger compartment 2 can be subsequently connected to this connection piece 18.

FIG. 6 shows another embodiment of a module for a motor vehicle. This module comprises a receptacle 6 that is realized essentially identically to the receptacle 6 shown in FIG. 2. Consequently, a detailed description of this receptacle 6 is not repeated at this point. The following description merely pertains to slight differences between this receptacle and the receptacle 6 shown in FIG. 2. In order to connect the receptacle 6 to a linear wiper system 67, it is necessary to slightly change the fastening points 30' because the fastening points 30 on the carrier 68 of the linear wiper system are arranged at different locations than those of the tubular frame system according to FIG. 2. In this case, two fastening points 30' are displaced to the rear upper edge of the receptacle. The other two fastening points 30 of the linear wiper system or 30' of the receptacle 6 are arranged at the same locations as in FIG. 2 and remain unchanged. The through-openings of the unnecessary fastening points 30' of the receptacle 6 are either not produced or subsequently covered with suitable caps. The through-openings 31 for the bearing shafts of the wiper bearings 23 which are required in the embodiment according to FIG. 2, but unnecessary in the embodiment according to FIG. 6, are also not produced or covered by corresponding caps.

The linear wiper system 67 comprises the carrier 68 with a frame 69 that accommodates the windshield 70. The carrier 68 or parts of the frame 69 are realized in such a way that they contain integrated guide rails for the wiper 71 that transversely moves over the windshield 70. In addition, the wiper motor 25 and a cable drive for driving the wiper 71 are arranged on the carrier 68. In addition to the cable driving roller 72, the cable drive also comprises various deflection rollers 66. In other respects, the carrier 68 is shaped in such a way that it can be connected to the receptacle 6 instead of a tubular frame system 7. In this case, the receptacle 6 also surrounds the respective sections of the linear wiper system 67 approximately complimentarily. FIG. 6 also shows that the frame 69 of the linear wiper system is already equipped with several spraying nozzles 35.

FIGS. 7 and 8 show two different examples of the connection between the linear wiper system and the motor vehicle body 73 within the region of the edge of the windshield 70. In these figures, only the upper edge of the windshield 70 is shown. These figures show that the edge of the windshield 70 is inserted into a groove 74 of the frame 69. It goes without saying that this connection is realized in water-tight fashion, if so required, with the aid of sealing agents. The upper edge of the frame 69 contains an integrated guide rail, in which the wiper 71 is transversely guided over the windshield 70. FIG. 7 shows that the upper edge of the frame 69 is directly connected to the motor vehicle body by means of a binder 75 that is simultaneously realized in sealing fashion. In FIG. 8, the windshield 70 is adhered to the motor vehicle body 73. In this case, the frame 69 is arranged in a corresponding depression of the motor vehicle body 73, with an additional seal 76 that is attached to the frame 69 and adjoins the motor vehicle body sealing the hollow space 77 formed due to the depression in the motor vehicle body 73 relative to the surroundings.

FIG. 9 shows one example of the connection between the linear wiper system and the motor vehicle body 73 within the region of the lower edge of the windshield 70. This connection can be used with either of the connecting options for the upper edge of the windshield 70 which are shown in FIGS. 7 and 8. FIG. 9 shows that the lower edge of the windshield 70 is also arranged in a groove 74 of the frame 69. It is preferred to realize this connection in sealed fashion. A guide roller 78 is shown on the lower end section of the wiper 71 which is perpendicularly bent several times. This guide roller is arranged between the two guide rails 79 that are situated opposite to one another and integrated into the lower edge of the frame 69. This figure also shows that the windshield is fastened to a part of the motor vehicle body 73 which has the shape of a hollow profile by means of the binder 75 within the vicinity of its lower edge.

FIG. 10 shows a lateral edge of the windshield 70 which serves for explaining the design of the frame 69 of a linear wiper system 67 and the connection of the frame 69 to the windshield 70 or the frame 69 to the motor vehicle body 73. The frame 69 that is connected to the edge of the windshield by means of a binder 75 is essentially realized in the form of a hollow profile. Through-openings 80 that are realized similar to sleeves and provided for accommodating a fastening screw 81 for fastening the frame 69 to the motor vehicle body 73 are arranged in the hollow profile at certain distances from one another. The hollow profile of the frame 69 which is-advantageously manufactured of aluminum or a suitable plastic also contains an integrated channel 82, in which the cable 83 for moving the not-shown wiper 71 is arranged and guided. A diaphragm 84 that can be connected to the frame 69 by means of a snap connection covers the frame 69 and the connecting point between the windshield 70 and the frame 69 as well as the connecting point between the frame 69 and the motor vehicle body 73. The inner surface of the diaphragm 84 is provided with projections 85 that can be advantageously snapped into the outwardly directed slot of the channel 82. In addition, a channel 86 for transporting the washing fluid as well as several spraying nozzles 35 that are distributed over the length of the windshield edge are arranged in the longitudinal side of the diaphragm 84 which faces the windshield 70.

Another embodiment is shown in FIG. 11. In this case, the frame 69 is also connected to the windshield 70 by means of a binder 75. The connection (not shown) between the frame 69 and the motor vehicle body could also be realized in the form of a binder within the section 87. The particularity of this embodiment can be seen in the fact that the frame 69 is equipped with integrated snap receptacles 88 at predetermined locations. One respective spraying nozzle 35 can be inserted into each snap receptacle. A diaphragm 84 also covers the region of the frame 69 in this case. A correspondingly large opening 90 is provided in the diaphragm 84 at the locations at which the adjustable nozzle ball 89 of a spraying nozzle 35 is situated. The jet emerging from the nozzle ball 89 reaches the windshield 70 through these openings.

One last embodiment is shown in FIG. 12. In this case, the windshield 70 is also connected to the carrier 69 by means of a binder 75. The carrier 69 has such an advantageous cross-sectional shape that it can be manufactured by means of extrusion. The spraying nozzles 35 used in connection with this carrier 69 consist of two parts. The lower base part with a cylindrical projection 91 situated in the longitudinal direction of the frame 69 is arranged and held in a corresponding channel-like profile part of the frame 69. A fluid line for the washing fluid can be connected to this cylindrical projection. A hollow-cylindrical section 92 begins at this cylindrical projection 91, wherein a hollow-cylindrical projection 93 that is integrally formed onto the inner side of the diaphragm 84 is inserted into the hollow-cylindrical section in telescoping fashion. An adjustable nozzle ball 89 is inserted into the opening 94 of this hollow-cylindrical projection 93 which widens toward the outside. The diaphragm 94 is simultaneously held on the frame 69 by the connection between the hollow-cylindrical section 92 and the hollow-cylindrical projection 93, both of which represent parts of the spraying nozzle 35. In this embodiment, the frame 69 can also be connected to the motor vehicle body 73 by means of a binder within the section 87.

Reference Numerals
1 Engine compartment
2 Passenger compartment
3 Fire wall
4 Opening
5 Radiator tank
6 Receptacle
7 Windshield wiper system
8 Tank for washing fluid
9 Tank for antifreeze
10 Tank for strong cleaning agent
11 Filler neck for washing fluid
12 Filler neck for antifreeze
13 Filler neck for strong cleaning agent
14 Pump
15 Pump 16 Rainwater inlet
17 Air passage
18 Air outlet connection
19 Rain sensor
20 Engine compartment light
21 Switch
22 Tubular frame
23 Wiper bearing
24 Motor carrying plate
25 Wiper motor
26 Linkage
27 Washing fluid line
28 Plug connection
29 Steering column switch
30 Fastening point
30' Fastening point
31 Through-opening
32 Screw
33 Wiper arm
34 Wiper blade
35 Spraying nozzle
36 Partition wall
38 Outlet opening
39 Filling level limiter
40 Overflow
42 Bay
43 Connection piece
44 Bay
45 Pump
46 Connection piece
47 Fluid line
48 Return valve
49 Electronic control element
50 Sensor
51 Sensor
52 Sensor
55 Bay
56 Connection piece
57 Hose line section
58 Coupling piece
59 Inlet branch
60 Return valve
61 Fresh air filter
62 Fine filter
63 Activated carbon filter
64 Recess
65 Fastening element
66 Cable deflection roller
67 Linear wiper system
68 Carrier
69 Frame
70 Windshield
71 Wiper
72 Cable driving roller
73 Motor vehicle body
74 Groove
75 Binder
76 Seal
77 Hollow space
78 Guide roller
79 Guide rail
80 Through-opening
81 Fastening screw
82 Channel
83 Cable
84 Diaphragm
85 Projection
86 Channel
87 Section
88 Snap receptacle
89 Nozzle ball
90 Opening
91 Projection
92 Section
93 Projection
94 Opening

We claim:

1. Module for a motor vehicle, comprising:
a windshield wiper system attached to a windshield washer system, wherein said windshield washer system includes a fluid container shaped such that it partially covers the windshield wiper system,
and wherein said windshield washer system is provided with an air passage adapted to lead to a passenger compartment of said motor vehicle,
and wherein the windshield wiper system is mounted on a carrier,
and wherein the fluid container includes at least two independent tanks that can be separately filled,
and wherein said at least two independent tanks are adapted to hold windshield washing fluid and antifreeze fluid respectively,
a pump for the antifreeze pump having an inlet side and an outlet side, wherein said inlet side is in fluid communication with said antifreeze fluid holding tank and said outlet of said pump is in fluid communication with said windshield washing fluid holding tank,
and wherein a filter neck of the windshield washing fluid holding tank is equipped with a filling level limiter that maintains a sufficiently large tank volume free for pumping antifreeze fluid into said windshield washing fluid holding tank,
and wherein a fresh air filter resides in said air passage of said windshield washer system.

2. Module according to claim 1, wherein the communication between said outlet of said pump for the antifreeze and said windshield washing fluid holding tank is accomplished by way of a fluid line that is routed through the windshield washing fluid tank bottom, wherein a return valve that prevents an overflow of the washing fluid into the antifreeze fluid holding tank is arranged in said fluid line.

3. Module according to claim 1, wherein an electronic control element is connected to the output of a sensor for measuring the density of the washing fluid, the output of a sensor for measuring the temperature of the washing fluid, and the output of a sensor for measuring the outside temperature, and wherein the control element triggers the pump for the antifreeze and activates said pump if the evaluation of the signals delivered by the sensors indicates that the washing fluid may freeze.

4. Module according to claim 1, wherein the fluid container further includes a tank for a strong cleaning agent, wherein the strong cleaning agent tank is in communication with by a corresponding pump said corresponding pump, is coupled into a washing fluid line that leads to a spraying nozzle.

5. Module according to claim 4, wherein said windshield washing fluid holding tank further includes an outlet that is coupled to said washing fluid line via a hose line section.

6. Module according to claim 1, wherein the pump for the antifreeze can be activated upon demand by the driver of the motor vehicle or by a control element.

7. Module according to claim 1, wherein the windshield washing fluid holding tank is equipped with a rainwater inlet.

8. Module according to claim 7, wherein the rainwater inlet is connected to the filler neck of the windshield washing fluid holding tank.

9. Module according to claim 1, wherein said windshield wiper system includes a linear wiper system including a drive motor, wherein the windshield of the motor vehicle is accommodated in a frame that surrounds the edges of the windshield and comprises integrated guide rails for a wiper that linearly moves over the windshield, and wherein the drive motor and a corresponding gear for driving the wiper are arranged on said frame.

10. Module according to claim 9, further including spraying nozzles integrally formed on the frame of the linear wiper system or on a diaphragm of the frame.

11. Module according to claim 9, wherein the frame of the linear wiper system is directly connected to the windshield.

12. Module according to claim 9, wherein the frame is adhered to the windshield.

13. Module according to claim 9, wherein the windshield carries the frame of the linear wiper system and is fastened to the motor vehicle body by means of a binder.

14. Module according to claim 9, wherein the frame carries the windshield and is connected to the motor vehicle body by means of a screw connection or a binder.

15. Module according to claim 1, wherein the fresh air filter includes a fine filter and a subsequently arranged activated carbon filter.

16. Module according to claim 1, further including an engine compartment light and a switch for the engine compartment light that is activated by opening or closing the hood.

* * * * *